(12) United States Patent
Nakamoto et al.

(10) Patent No.: US 12,091,241 B2
(45) Date of Patent: Sep. 17, 2024

(54) TRASH BOX

(71) Applicant: TOYOTA JIDOSHA KABUSHIKI KAISHA, Toyota (JP)

(72) Inventors: Yoshiaki Nakamoto, Nisshin (JP); Yuta Itozawa, Nagoya (JP); Hirotaka Komura, Tokyo (JP); Yutaro Takagi, Tokyo (JP); Junya Ota, Tokyo (JP); Kunihiro Iwamoto, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 397 days.

(21) Appl. No.: 17/545,309

(22) Filed: Dec. 8, 2021

(65) Prior Publication Data

US 2022/0227576 A1    Jul. 21, 2022

(30) Foreign Application Priority Data

Jan. 21, 2021   (JP) ................................. 2021-008015

(51) Int. Cl.
| | | |
|---|---|---|
| *B65F 1/14* | (2006.01) | |
| *B65F 1/16* | (2006.01) | |
| *B65F 3/02* | (2006.01) | |
| *G06F 3/01* | (2006.01) | |
| *G10L 15/22* | (2006.01) | |

(52) U.S. Cl.
CPC ................ *B65F 1/141* (2013.01); *B65F 1/16* (2013.01); *B65F 3/02* (2013.01); *G06F 3/017* (2013.01); *G10L 15/22* (2013.01); *G10L 2015/223* (2013.01)

(58) Field of Classification Search
CPC .... B65F 1/141; B65F 1/16; B65F 3/02; G02F 3/017; G01L 15/22
USPC ......................................................... 220/475
See application file for complete search history.

(56) References Cited

U.S. PATENT DOCUMENTS

| | | | | |
|---|---|---|---|---|
| 3,563,452 | A * | 2/1971 | Cantella | B65F 1/06 |
| | | | | 232/44 |
| 4,860,909 | A * | 8/1989 | Leumi | B65F 1/12 |
| | | | | 220/908 |
| 9,829,892 | B1 * | 11/2017 | Rodoni | G05D 1/0291 |
| 2002/0154978 | A1 * | 10/2002 | Neufeldt | B65F 1/12 |
| | | | | 414/422 |
| 2018/0074512 | A1 * | 3/2018 | Rodoni | G05D 1/0291 |
| 2022/0226986 | A1 * | 7/2022 | Iwamoto | B65G 1/1378 |
| 2022/0227577 | A1 * | 7/2022 | Iwamoto | B65F 3/02 |

FOREIGN PATENT DOCUMENTS

| | | | | |
|---|---|---|---|---|
| CN | 204223603 | U | 3/2015 | |
| CN | 205686962 | U | 11/2016 | |
| CN | 107161573 | A * | 9/2017 | ............ B65F 1/1452 |

(Continued)

*Primary Examiner* — J. Gregory Pickett
*Assistant Examiner* — Niki M Eloshway
(74) *Attorney, Agent, or Firm* — Oliff PLC (57) ABSTRACT

A trash box is a trash box including a trash box main body in which trash is accommodated. A top surface or a side surface of the trash box main body includes an input port via which the trash is put into the trash box main body. A bottom surface of the trash box main body includes an opening-closing portion. The trash box main body is placed such that the opening-closing portion faces a reference plane that is a floor face or ground. The trash box main body is changeable in height from the reference plane.

4 Claims, 7 Drawing Sheets

(56) References Cited

FOREIGN PATENT DOCUMENTS

| | | | |
|---|---|---|---|
| CN | 206665429 U | 11/2017 | |
| CN | 108328170 A | 7/2018 | |
| CN | 110092109 A * | 8/2019 | |
| CN | 209210280 U | 8/2019 | |
| DE | 10043876 A1 * | 4/2002 | ................ B65F 1/12 |
| EP | 1074487 A1 * | 2/2001 | ................ B65F 1/12 |
| JP | H05-082902 U | 11/1993 | |
| JP | 2001-278404 A | 10/2001 | |
| JP | 2002-104604 A | 4/2002 | |
| JP | 2003-246407 A | 9/2003 | |
| JP | 2005350191 A * | 12/2005 | ................ B65F 1/12 |
| JP | 2009-096636 A | 5/2009 | |
| JP | 2020-075326 A | 5/2020 | |
| KR | 10-2014-0035061 A | 3/2014 | |

* cited by examiner

TRASH BOX

CROSS-REFERENCE TO RELATED APPLICATION

This application claims priority to Japanese Patent Application No. 2021-008015 filed on Jan. 21, 2021, incorporated herein by reference in its entirety.

BACKGROUND

1. Technical Field

This disclosure relates to a trash box.

2. Description of Related Art

Generally, trash is temporarily accumulated in a trash box, and after that, the trash is collected from the trash box and carried to a trash collection site or the like. Japanese Unexamined Patent Application Publication No. 2009-096636 (JP 2009-096636 A) discloses a trash box including a freely openable and closable base plate provided on a bottom surface of the trash box. The trash box is fixed to a wall distanced from a floor face.

SUMMARY

With the use of a trash box described in JP 2009-096636 A, the trash accumulated inside the trash box can be collected from the bottom surface of the trash box. However, since the trash box is fixed to the wall at a distance from the floor face, an input port via which trash is put into the trash box is placed at a high position, so that it is difficult for short people such as children to put trash into the trash box.

This disclosure is accomplished in view of the above circumstances, and an object of this disclosure is to provide a trash box that can maintain a balance between collection of trash from the lower side of a trash box and convenience for a user who puts trash into the trash box.

One aspect to achieve the above object is a trash box is a trash box including a trash box main body in which trash is accommodate. A top surface or a side surface of the trash box main body includes an input port via which the trash is put into the trash box main body. A bottom surface of the trash box main body includes an opening-closing portion. The trash box main body is placed such that the opening-closing portion faces a reference plane that is a floor face or ground. The trash box main body is changeable in height from the reference plane. The trash box configured as such can achieve a height of the trash box main body, the height being suitable to collect trash from the lower side of the trash box, and a height of the trash box main body, the height being suitable for a person to put trash into the trash box. This makes it possible to balance collection of trash from the lower side of the trash box with convenience for a user who puts trash into the trash box.

In the one aspect, the trash box main body may be changeable between a first state where the trash box main body is distanced from the reference plane at a predetermined distance and a second state where a distance between the trash box main body and the reference plane is shorter than the predetermined distance. The predetermined distance may be larger than a height of an autonomous mobile robot configured to collect trash falling from the trash box main body when the opening-closing portion is opened. With such a configuration, it is possible to solve a problem that the input port is placed too high for a user to put trash into the trash box, and it is also possible to achieve collection of the trash by the autonomous mobile robot.

In the one aspect, the trash box may include a driving device configured to change a height of the trash box main body. With such a configuration, the height of the trash box main body is automatically changeable, thereby making it possible to improve the convenience of the trash box.

In the one aspect, when a state where the autonomous mobile robot comes near an installation position of the trash box main body is detected, the driving device may change a state of the trash box main body to the first state. With such a configuration, in a case where the autonomous mobile robot arrives, the height of the trash box main body can be changed automatically so that the autonomous mobile robot can move under the trash box main body.

In the one aspect, when a state where a person comes near the installation position of the trash box main body is detected, the driving device may change the state of the trash box main body to the second state. With such a configuration, in a case where a person arrives, the height of the trash box main body can be changed automatically to a height suitable for the person to put trash into the trash box.

In the one aspect, when a state where a person shorter than a predetermined threshold comes near the installation position of the trash box main body is detected, the driving device may change the state of the trash box main body to the second state. With such a configuration, in a case where a person who does not require a height change in the trash box main body, it is possible to restrain the trash box main body from being unnecessarily changed in height.

In the one aspect, the driving device may change the height of the trash box main body in response to a recognition result of a gesture or a voice of a person. With such a configuration, it is possible to improve the convenience of the trash box.

In the one aspect, the driving device may change the height of the trash box main body in response to an operation on an operating portion provided in the trash box. With such a configuration, it is possible to improve the convenience of the trash box.

With this disclosure, it is possible to provide a trash box that can maintain a balance between collection of trash from the lower side of the trash box and convenience for a user who puts trash into the trash box.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

With reference to drawings, the following describes an embodiment of the present disclosure.

Figure 1:
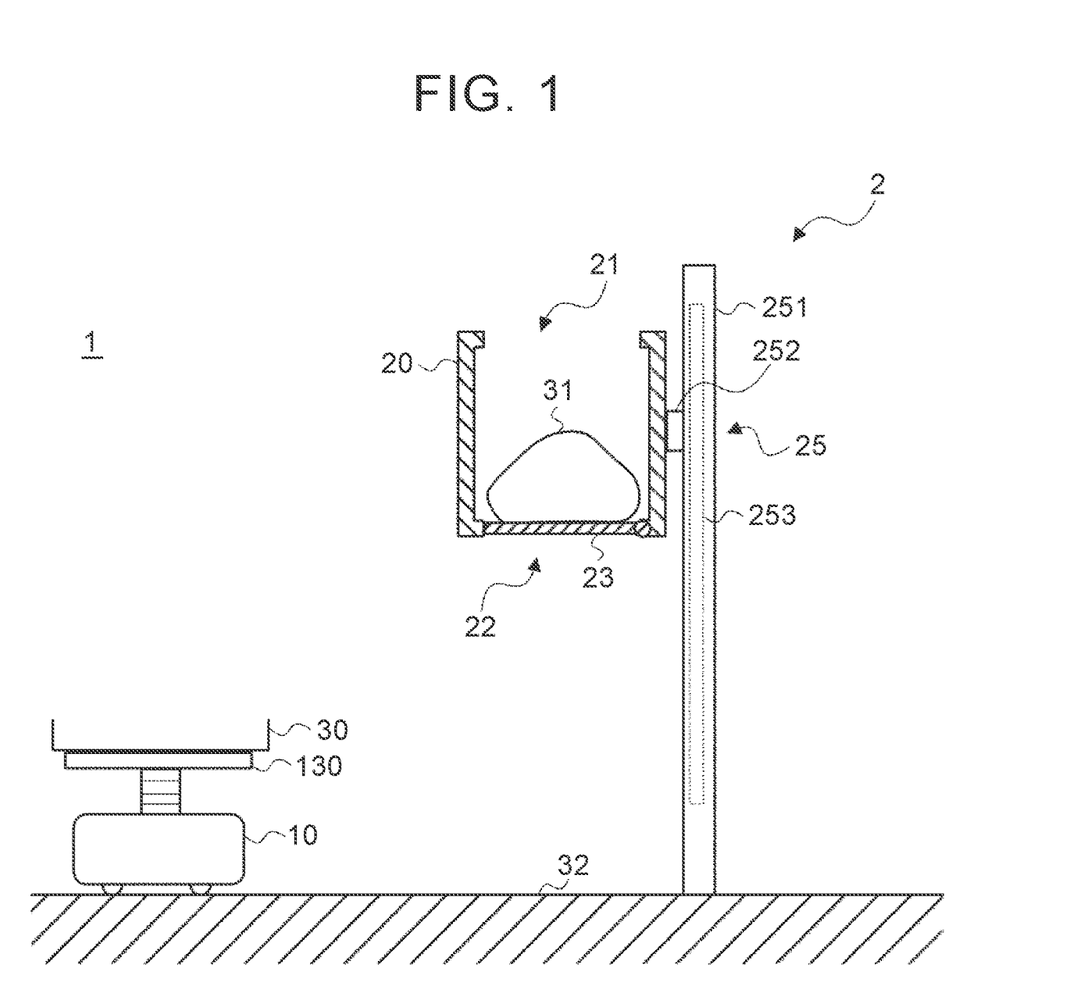
FIG. 1 is a schematic view illustrating one exemplary configuration of a trash collection system according to an embodiment.

FIG. 1 is a schematic view illustrating one exemplary configuration of a trash collection system 1 according to an embodiment. As illustrated in FIG. 1, the trash collection system 1 includes a trash box 2 and an autonomous mobile robot 10. Note that, in FIG. 1, a collection box 30 placed on a placement portion 130 provided in an upper part of the autonomous mobile robot 10 is also illustrated. The trash box 2 is provided in a given environment such as a house, a facility, a storeroom, a factory, the outdoors, and so on, for example.

The trash box 2 includes a trash box main body 20 and a sliding mechanism 25. The trash box main body 20 is a container in which trash 31 is accommodated. In FIG. 1, a section of the trash box main body 20 is illustrated. The trash box main body 20 has, for example, a cuboid shape, a columnar shape, or the like, but these are just examples. The trash box main body 20 may have other shapes.

The trash box main body 20 illustrated in FIG. 1 has an input port 21 and a discharge port 22. The input port 21 is an opening via which people or the like put trash 31 into the trash box main body 20. In the example illustrated in FIG. 1, the input port 21 is provided on a top surface of the trash box main body 20, but the input port 21 may be provided on a side surface of the trash box main body 20.

The discharge port 22 is an opening via which the autonomous mobile robot 10 collects the trash 31 inside the trash box main body 20. An opening-closing portion 23 is provided in the discharge port 22. The opening-closing portion 23 is a door (cover) provided in the discharge port 22 and can change the state of the discharge port 22 between a closed state (see FIG. 1) and an opened state (see FIG. 4). In the example illustrated in FIG. 1, the opening-closing portion 23 is a single swing door. However, the opening-closing portion 23 may be a double door or may be configured to open and close the discharge port 22 by three or more doors. Further, the opening-closing portion 23 is not limited to a configuration in which the discharge port 22 is opened and closed by rotating a door. The opening-closing portion 23 may be configured to open and close the discharge port 22 by sliding a door. That is, the opening-closing portion 23 should be any component configured to change the state of the discharge port 22 between the closed state and the opened state, and the opening-closing portion 23 can employ a well-known given configuration as its specific configuration. Note that, in the example illustrated in FIG. 1, the input port 21 is not provided with an opening-closing portion, but the input port 21 may be also provided with an opening-closing portion.

The discharge port 22 and the opening-closing portion 23 are provided on a predetermined surface of the trash box main body 20, more specifically, a bottom surface of the trash box main body 20. As illustrated in FIG. 1, the trash box main body 20 is provided by use of a sliding mechanism 25 such that the opening-closing portion 23 and the discharge port 22 face a reference plane 32 that is a floor face or ground, that is, the predetermined surface on which the opening-closing portion 23 is provided faces the reference plane 32. The trash box main body 20 is attached to the sliding mechanism 25. As illustrated in FIG. 1, for example, the sliding mechanism 25 includes a support 251, a slider 252, and a slider driving device 253. The support 251 is a support configured to support the trash box main body 20. The support 251 supports the trash box main body 20 such that the height of the trash box main body 20 is changeable. More specifically, the height of the trash box main body 20 is changed by the slider 252 and the slider driving device 253 provided in the support 251. The slider 252 is a component linearly moving in the up-down direction in the support 251 and is attached to the trash box main body 20. Accordingly, the trash box main body 20 moves in the up-down direction along with the movement of the slider 252, so that the installation height of the trash box main body 20 changes. The position of the slider 252 is changed by the slider driving device 253. The slider driving device 253 includes an actuator such as a motor, and a controller configured to control the actuator. Note that the controller may have a function as a computer. That is, the controller may include a processor and a memory.

Figure 2:
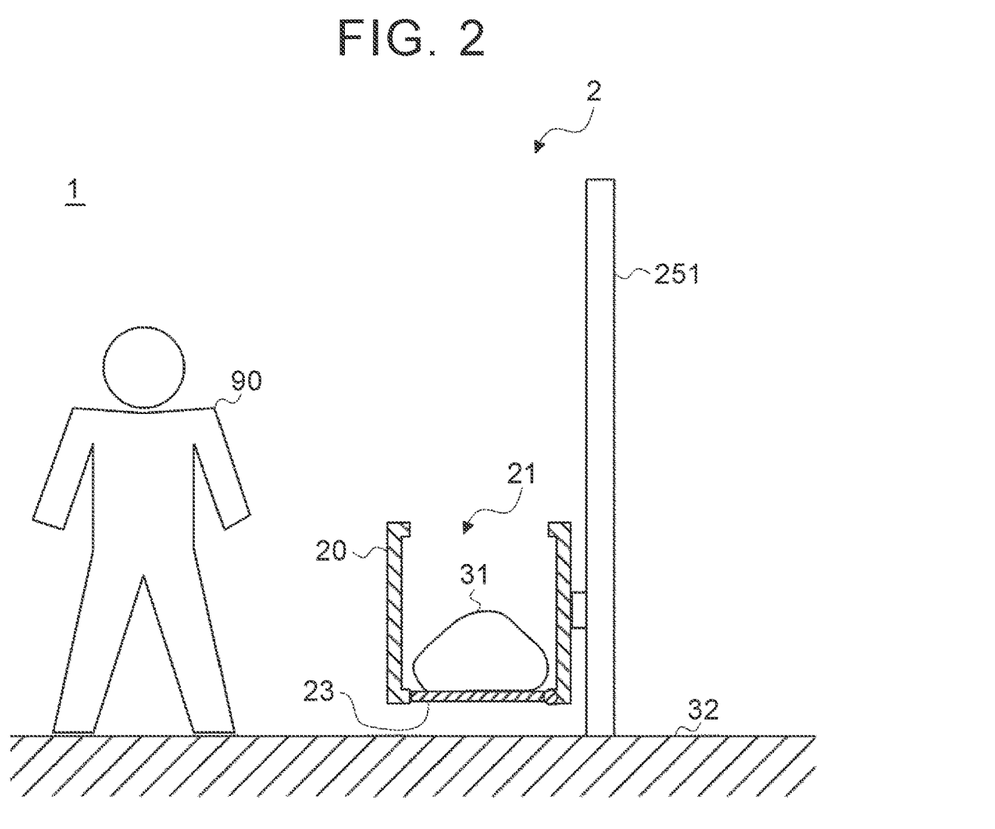
FIG. 2 is a schematic view illustrating a state where a trash box main body is lowered.

FIG. 1 is a schematic view illustrating a state where the trash box main body 20 is raised. In the meantime, FIG. 2 is a schematic view illustrating a state where the trash box main body 20 is lowered. As illustrated in FIG. 1, in a case where the trash box main body 20 is raised, a space into which the autonomous mobile robot 10 enters is formed below the trash box main body 20. Accordingly, when the opening-closing portion 23 is opened, the autonomous mobile robot 10 can receive the trash 31 falling from the trash box main body 20. However, in this case, the trash box main body 20 is raised, and therefore, it might be difficult for people to reach the input port 21. Particularly, it is difficult for a short user to reach the input port 21. Accordingly, it might be difficult for the short user to put trash into the trash box main body 20. In the meantime, as illustrated in FIG. 2, in a case where the trash box main body 20 is lowered, the input port 21 is also lowered, so that a user 90 can easily put trash into the trash box main body 20. Note that, in the example illustrated in FIG. 2, the trash box main body 20 floats from the reference plane 32, but the trash box main body 20 may be lowered to the height at which the trash box main body 20 makes contact with the reference plane 32.

As such, the trash box main body 20 can be changed between a first state (hereinafter referred to as a raised state) where the trash box main body 20 is distanced from the reference plane 32 at a predetermined distance and a second state (hereinafter referred to as a lowered state) where the distance between the trash box main body 20 and the reference plane 32 is shorter than the predetermined distance. Here, the predetermined distance is larger than the height of the autonomous mobile robot 10 configured to collect the trash 31 falling from the trash box main body 20 when the opening-closing portion 23 is opened. This configuration can solve the problem that the input port is placed too high for a user to put trash into the trash box, as described above, and can achieve collection of the trash 31 by the autonomous mobile robot 10.

Figure 3:
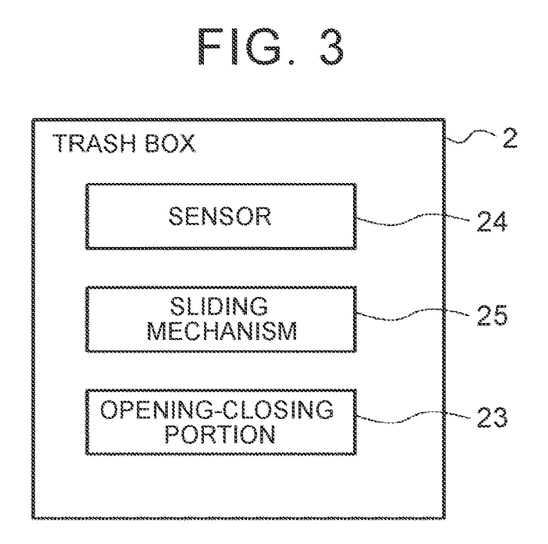
FIG. 3 is a block diagram illustrating constituents of a trash box of the embodiment, the constituents being related to a height control of the trash box main body and discharge of trash.

FIG. 3 is a block diagram illustrating constituents of the trash box 2 of the present embodiment, the constituents being related to a height control of the trash box main body 20 and discharge of trash. As illustrated in FIG. 3, the trash box 2 includes a sensor 24 in addition to the opening-closing portion 23 and the sliding mechanism 25. The sensor 24 may be provided in the trash box main body 20 or may be provided in the support 251.

The sensor 24 is a sensor configured to recognize approach of an object and the object thus approaching the trash box 2. The sensor 24 particularly detects whether the object thus approaching the trash box 2 is a person or the autonomous mobile robot 10. Further, the sensor 24 also detects whether the object has arrived at a predetermined position or not. Here, the predetermined position is, specifically, a collecting position at which the trash 31 accommodated in the trash box main body 20 is collected, and more specifically, a position right under the opening-closing portion 23. The sensor 24 may be a camera and an image processor configured to process an image captured by the camera, for example, or may be a well-known sensor.

In the present embodiment, the slider driving device 253 of the sliding mechanism 25 changes the position of the slider 252, that is, the position of the trash box main body 20 in the up-down direction, based on a detection result from the sensor 24. That is, the slider driving device 253 changes the height of the trash box main body 20. More specifically, when the sensor 24 detects the autonomous mobile robot 10 coming near the installation position of the trash box main body 20 (e.g., within a predetermined range from the installation position of the trash box main body 20), the slider driving device 253 changes the state of the trash box main body 20 to the raised state. Hereby, in a case where the autonomous mobile robot 10 arrives, the height of the trash box main body 20 can be changed automatically so that the autonomous mobile robot 10 moves under the trash box main body 20. Further, when the sensor 24 detects a person coming near the installation position of the trash box main body 20, the slider driving device 253 changes the state of the trash box main body 20 to the lowered state. Hereby, in a case where a person arrives, the height of the trash box main body 20 can be changed automatically to a height suitable for the person to put trash into the trash box main body 20. Note that, only when the sensor 24 detects a person coming near the installation position of the trash box main body 20, the person being shorter than a predetermined threshold, the slider driving device 253 may change the state of the trash box main body 20 to the lowered state. This configuration can restrain the height of the trash box main body 20 from being changed unnecessarily in a case where a person who does not require a height change in the trash box main body 20.

Further, the opening-closing portion 23 of the present embodiment is changed from the closed state to the opened state based on the detection result from the sensor 24. That is, when the sensor 24 detects the autonomous mobile robot 10 arriving at a predetermined position (the collecting position to collect the trash 31), the opening-closing portion 23 opens the door that has closed the discharge port 22, so that the discharge port 22 is opened. The opening-closing portion 23 may include an actuator such as a motor, for example, and may be changed between the opened state and the closed state by the actuator. Note that, when a predetermined time passes after the opening-closing portion 23 is brought into the opened state, the opening-closing portion 23 may shift to the closed state. Further, when the sensor 24 detects the autonomous mobile robot 10 leaving from the predetermined position, the opening-closing portion 23 may shift to the closed state. Note that the opening-closing portion 23 may not include an electrical drive mechanism for the operation of the door. For example, the opening-closing portion 23 may be opened by the deadweight of the door of the opening-closing portion 23, elastic force of an elastic member, or the like. In this case, for example, when a fastener configured to prevent opening of the door of the opening-closing portion 23 operates in response to a detection result, the opening-closing portion 23 may be opened by the deadweight, the elastic force, or the like. Further, in terms of closing of the opening-closing portion 23, the opening-closing portion 23 may be closed by a person or a robot instead of automatic door closing of the trash box 2.

Figure 4:
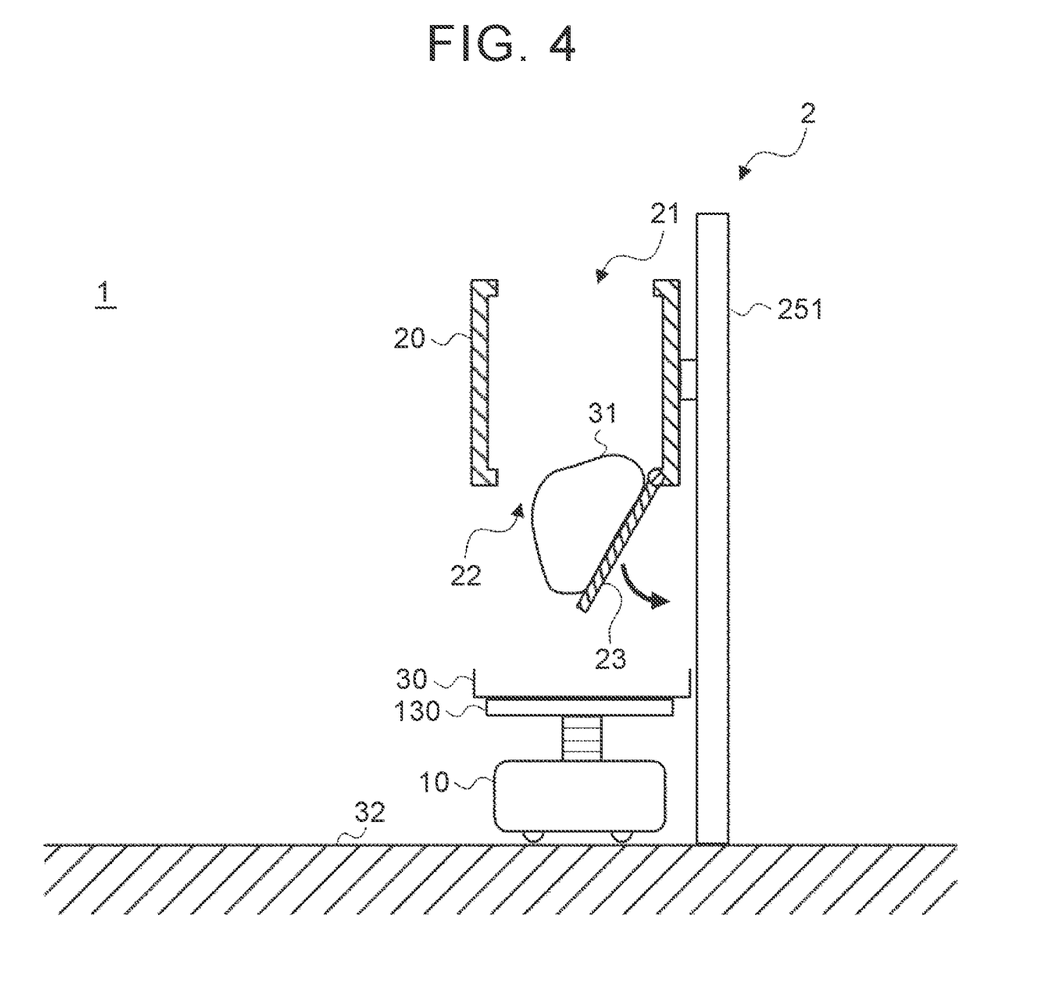
FIG. 4 is a schematic view illustrating a state where an opening-closing portion is opened.

FIG. 4 is a schematic view illustrating a state where the opening-closing portion 23 is opened. As illustrated in FIG. 4, in the present embodiment, when the autonomous mobile robot 10 arrives at the predetermined position, the sensor 24 detects this, and the opening-closing portion 23 is opened. Hereby, the trash 31 accommodated in the trash box main body 20 falls down, so that the trash 31 is put on the placement portion 130 of the autonomous mobile robot 10. Note that, in FIG. 4, the collection box 30 in which the collected trash 31 is put is placed on the autonomous mobile robot 10, but the trash 31 may be directly placed on the autonomous mobile robot 10 without using the collection box 30.

Figure 5:
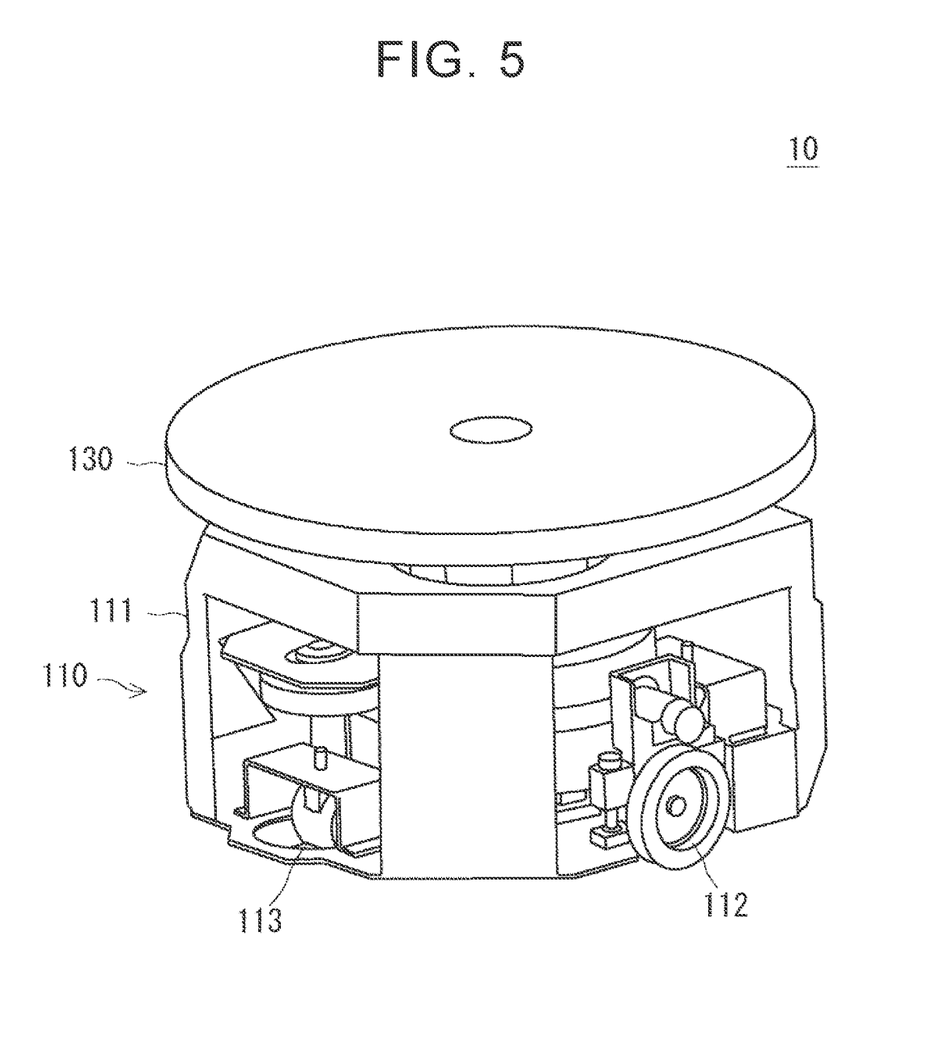
FIG. 5 is a perspective view illustrating a schematic configuration of an autonomous mobile robot according to the embodiment.
Figure 6:
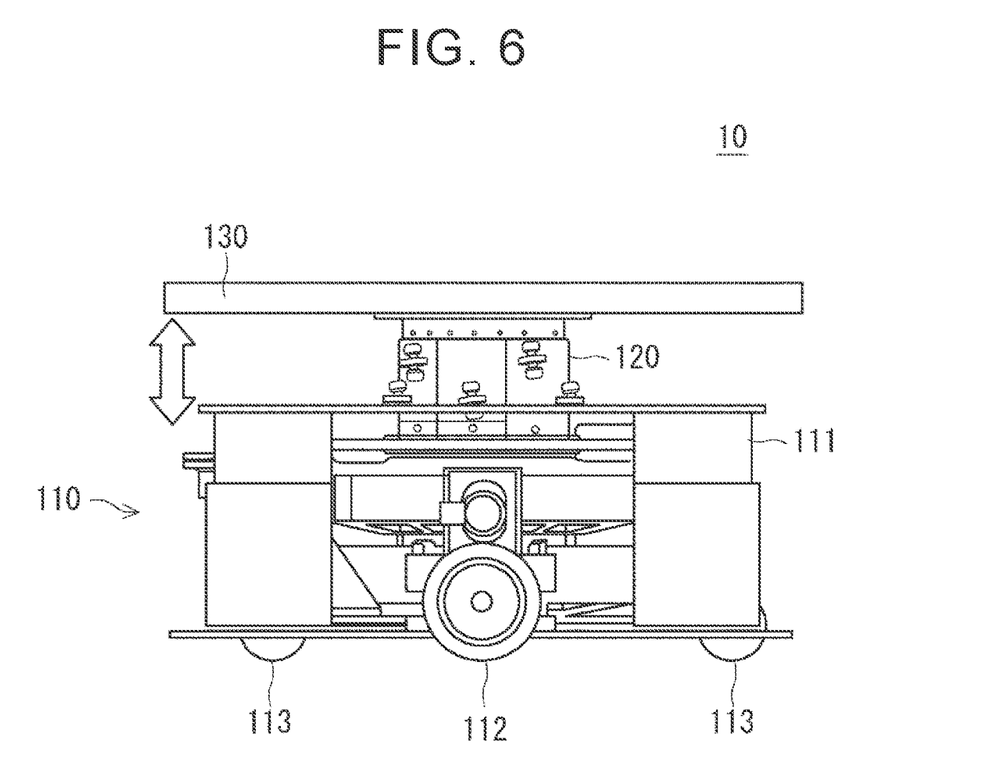
FIG. 6 is a side view illustrating a schematic configuration of the autonomous mobile robot according to the embodiment.
Figure 7:
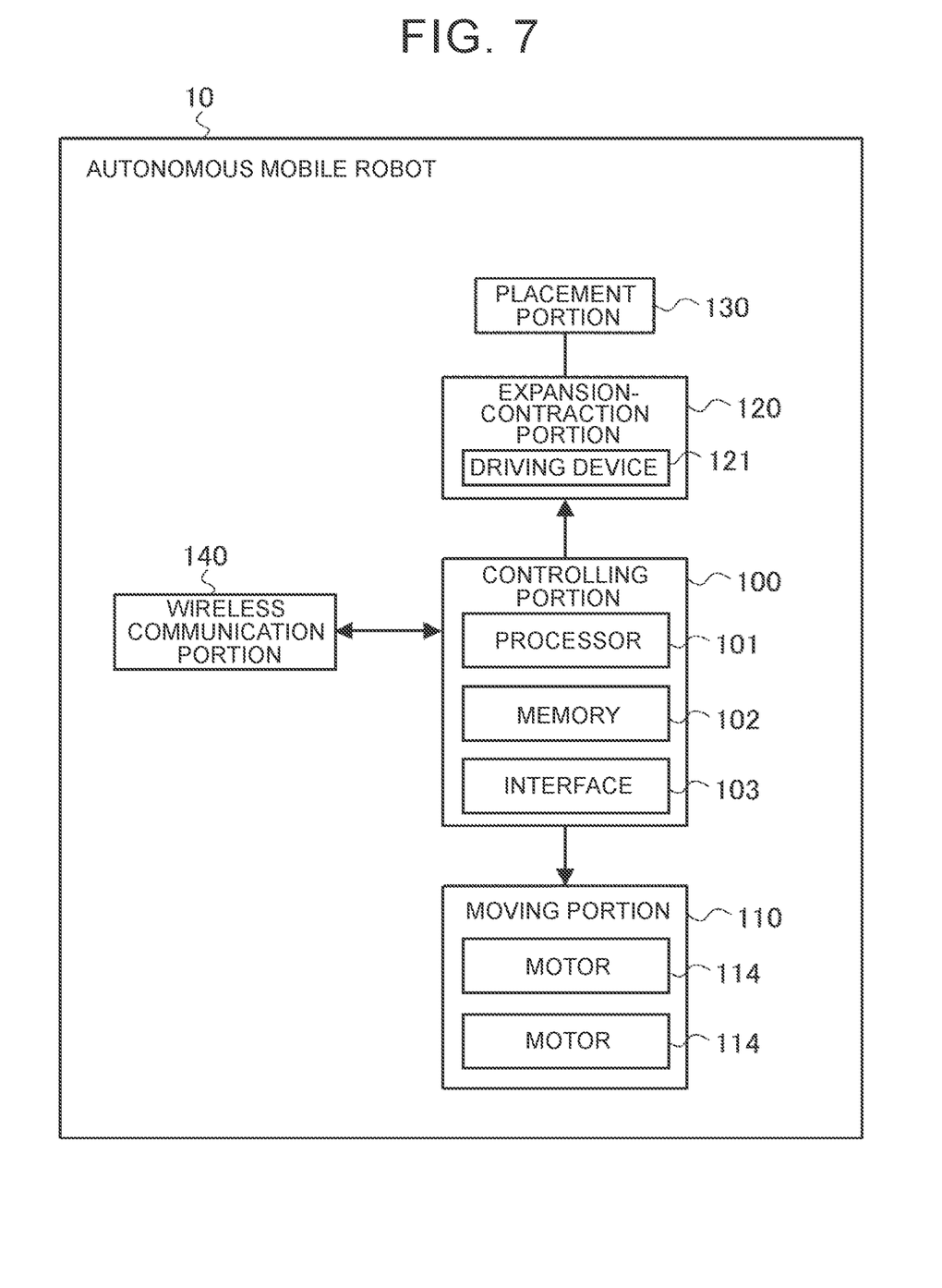
FIG. 7 is a block diagram illustrating a schematic system configuration of the autonomous mobile robot according to the embodiment.

Next will be described the autonomous mobile robot 10. FIG. 5 is a perspective view illustrating a schematic configuration of the autonomous mobile robot 10 according to the present embodiment. FIG. 6 is a side view illustrating a schematic configuration of the autonomous mobile robot 10 according to the present embodiment. FIG. 7 is a block diagram illustrating a schematic system configuration of the autonomous mobile robot 10 according to the present embodiment.

The autonomous mobile robot 10 according to the present embodiment is a robot configured to autonomously move in a movement environment such as a house, a facility, a storeroom, a factory, or the indoors, for example. The autonomous mobile robot 10 collects the trash 31 in the trash box 2 and carries the trash 31 to a predetermined place. The autonomous mobile robot 10 travels on the reference plane 32, for example. The autonomous mobile robot 10 according to the present embodiment includes a movable moving portion 110, an expansion-contraction portion 120 configured to expand and contract in the up-down direction, the placement portion 130 configured to support an object (the trash 31) placed thereon, a controlling portion 100 configured to control the autonomous mobile robot 10, including controls of the moving portion 110 and the expansion-contraction portion 120, and a wireless communication portion 140.

The moving portion 110 includes a robot main body 111, a pair of right and left driving wheels 112 and a pair of front and rear driven wheels 113 rotatably provided in the robot main body 111, and a pair of motors 114 configured to rotationally drive the driving wheels 112. The motors 114 rotates the driving wheels 112, respectively, via respective speed reducers or the like. When the motors 114 rotate the driving wheels 112 in response to a control signal from the controlling portion 100, the robot main body 111 is allowed to move forward, move rearward, and rotate. Hereby, the robot main body 111 can move to a given position. Note that the configuration of the moving portion 110 is just one example, and the moving portion 110 is not limited to this. For example, any numbers of the driving wheels 112 and the driven wheels 113 in the moving portion 110 can be provided, and the moving portion 110 can employ any configuration, provided that the moving portion 110 can move the robot main body 111 to a given position.

The expansion-contraction portion 120 is an expansion-contraction mechanism configured to expand and contract in the up-down direction. The expansion-contraction portion 120 may be configured as a telescopic expansion-contraction mechanism. The placement portion 130 is provided in an upper end part of the expansion-contraction portion 120, and the placement portion 130 is raised and lowered by operation of the expansion-contraction portion 120. The expansion-contraction portion 120 includes a driving device 121 such as a motor, and the expansion-contraction portion 120 is driven by the driving device 121 so as to expand and contract. That is, the placement portion 130 is raised and lowered by the driving of the driving device 121. The driving device 121 drives the expansion-contraction portion 120 in response to a control signal from the controlling portion 100. Note that, instead of the expansion-contraction portion 120, the autonomous mobile robot 10 may employ a well-known given mechanism configured to control the height of the placement portion 130 provided on the upper side of the robot main body 111.

The placement portion 130 is provided in an upper part (a distal end) of the expansion-contraction portion 120. The placement portion 130 is raised and lowered by the driving device 121 such as a motor and is used to place the trash 31 carried by the autonomous mobile robot 10 on the placement portion 130. Note that, as illustrated in FIG. 1, the collection box 30 in which the collected trash 31 is put may be placed on the placement portion 130. However, as described above, the trash 31 may be directly placed on the placement portion 130 without using the collection box 30. In order to carry the trash 31, the autonomous mobile robot 10 moves together with the trash 31 (the collection box 30) with the trash 31 (the collection box 30) being supported by the placement portion 130. Hereby, the autonomous mobile robot 10 carries the trash 31 (the collection box 30).

The placement portion 130 is made of a plate material, for example. In the present embodiment, the shape of the plate material, that is, the shape of the placement portion 130, is a discoid shape with a flat top surface, for example, but may be any other shapes.

The wireless communication portion 140 is a circuit configured to perform wireless communication so as to communicate with a server, other robots, and so on as needed. For example, the wireless communication portion 140 includes a wireless transmission-reception circuit and an antenna. In a case where the trash box 2 has a communication function, the autonomous mobile robot 10 may communicate with the trash box 2 by the wireless communication portion 140. Note that the wireless communication portion 140 may be omitted in a case where the autonomous mobile robot 10 does not communicate with other devices.

The controlling portion 100 is a device configured to control the autonomous mobile robot 10 and includes a processor 101, a memory 102, and an interface 103. The processor 101, the memory 102, and the interface 103 are connected to each other via data buses and the like.

The interface 103 is an input-output circuit to be used to communicate with other devices such as the moving portion 110, the expansion-contraction portion 120, and the wireless communication portion 140.

The memory 102 is constituted by a volatile semiconductor memory and a nonvolatile semiconductor memory in combination, for example. The memory 102 is used to store software (computer programs) including one or more orders and executed by the processor 101, data to be used for various processes of the autonomous mobile robot 10, and so on.

The processor 101 performs a process (described later) of the controlling portion 100 by reading out the software (the computer programs) from the memory 102 and executing the software (the computer programs).

The processor 101 may be, for example, a microprocessor, a microprocessor unit (MPU), a central processing unit (CPU), or the like. The processor 101 may include a plurality of processors. Thus, the controlling portion 100 is a device functioning as a computer.

Note that the programs can be stored by use of various types of non-transitory computer readable media and supplied to the computer. The non-transitory computer readable media include various types of tangible storage media. Examples of the non-transitory computer readable media include magnetic recording media (e.g., a flexible disk, a magnetic tape, a hard disk drive), optical magnetic recording media (e.g., a magneto-optical disk), a CD read-only memory (CD-ROM), a CD-R, a CD-R/W, and a semiconductor memory (e.g., a mask ROM, a programmable ROM (PROM), an erasable PROM (EPROM), a flash ROM, and a random access memory (RAM)). Further, the programs can be supplied to the computer by various types of transitory computer readable media. Examples of the transitory computer readable media include an electrical signal, an optical signal, and an electromagnetic wave. The transitory computer readable media can supply the programs to the computer via a wired communication channel such as an electric wire or an optical fiber, or a wireless communication channel.

Next will be described the process of the controlling portion 100. The controlling portion 100 controls the operation of the autonomous mobile robot 10. For example, the controlling portion 100 controls the moving portion 110 and the expansion-contraction portion 120. The controlling portion 100 controls the rotation of the driving wheels 112 by transmitting control signals to the motors 114 of the moving portion 110, and hereby, the controlling portion 100 can move the robot main body 111 to a given position. Further, the controlling portion 100 can control the height of the placement portion 130 by transmitting a control signal to the driving device 121 of the expansion-contraction portion 120.

The controlling portion 100 may control the movement of the autonomous mobile robot 10 by performing a well-known control such as a feedback control or a robust control based on rotation information or the like of the driving wheels 112 that is detected by respective rotation sensors provided in the driving wheels 112. Further, the controlling portion 100 may autonomously move the autonomous mobile robot 10 by controlling the moving portion 110 based on information such as distance information detected by a range sensor or map information on the movement environment. The range sensor is, for example, a camera, an ultrasonic sensor, or the like provided in the autonomous mobile robot 10. In the present embodiment, the controlling portion 100 controls the autonomous mobile robot 10 such that the autonomous mobile robot 10 moves to a predetermined position near the installation position of the trash box 2, that is, the collecting position (e.g., a position right under the opening-closing portion 23) to collect the trash 31 in the trash box 2. Then, the controlling portion 100 controls the autonomous mobile robot 10 such that the autonomous mobile robot 10 moves to a predetermined place when the autonomous mobile robot 10 receives the trash 31 dropped from the discharge port 22 of the trash box main body 20. Hereby, the trash 31 is carried by the autonomous mobile robot 10 to the predetermined place. Note that the autonomous mobile robot 10 may grasp completion of receipt of the trash 31 by a signal from a sensor such as weight sensor configured to weighing the placement portion 130 or may grasp completion of receipt of the trash 31 by a notification transmitted from other devices such as the trash box 2.

Figure 8:
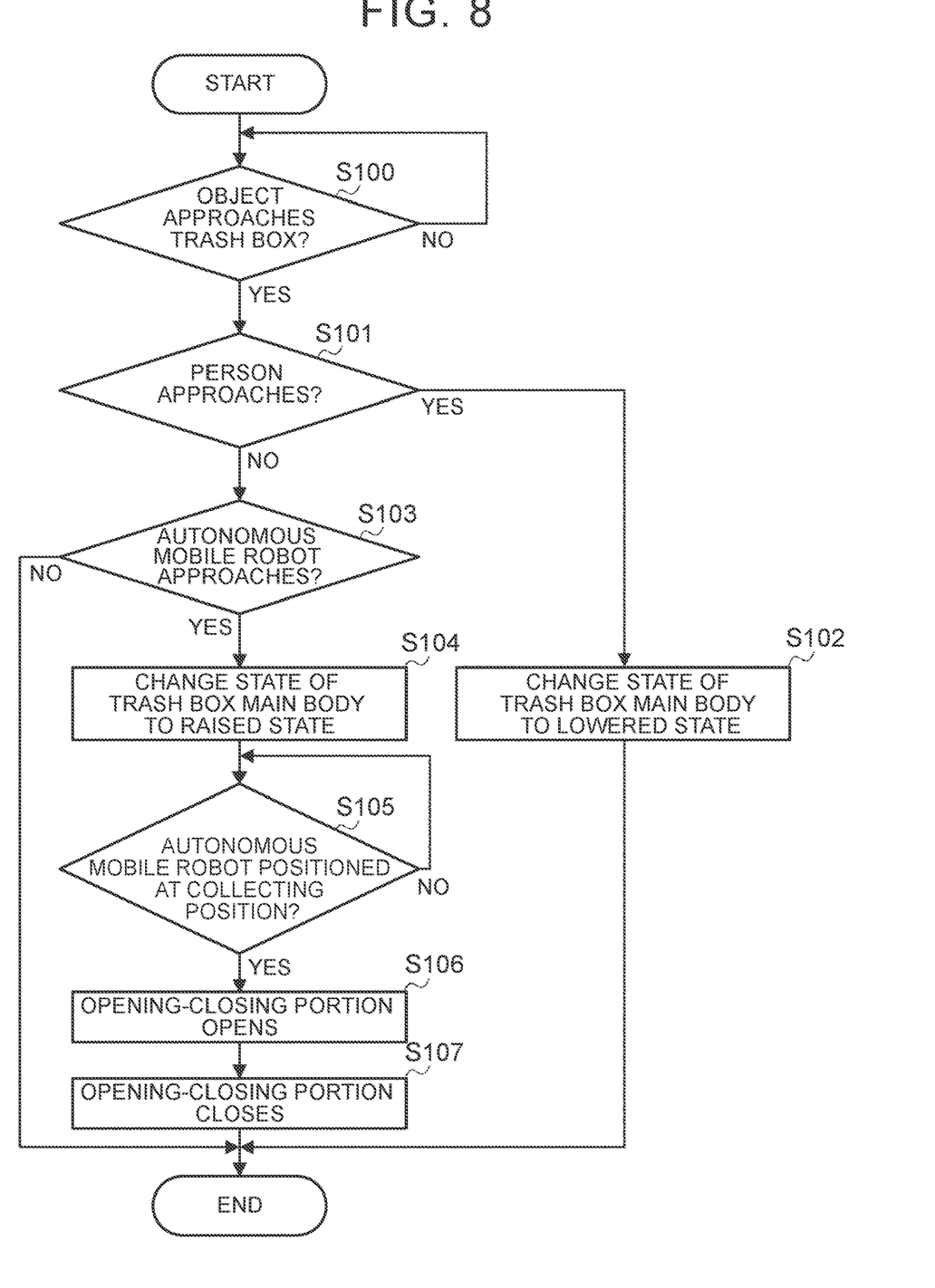
FIG. 8 is a flowchart illustrating an example of an operation of the trash box according to the embodiment.

Next will be described one example of the operation of the trash box 2 according to the present embodiment. FIG. 8 is a flowchart illustrating an example of the operation of the trash box 2 according to the present embodiment. The following description is made along FIG. 8.

In step S100, whether or not an object approaches the trash box 2 is detected. When the object approaches the trash box 2, it is determined in step S101 whether the object thus approaching the trash box 2 is a person or not. In a case where the object thus approaching the trash box 2 is a person, the process proceeds to step S102. On the other hand, in a case where the object thus approaching the trash box 2 is not a person, the process proceeds to step S103. In step S102, the slider driving device 253 changes the state of the trash box main body 20 to the lowered state. Note that, in a case where the trash box main body 20 is already in the lowered state, the process in step S102 is omitted. On the other hand, in step S103, it is determined whether the object thus approaching the trash box 2 is the autonomous mobile robot 10 or not. In a case where the object thus approaching the trash box 2 is the autonomous mobile robot 10, the process proceeds to step S104. On the other hand, in a case where the object thus approaching the trash box 2 is not the autonomous mobile robot 10, the process is ended. In step S104, the slider driving device 253 changes the state of the trash box main body 20 to the raised state. Note that, in a case where the trash box main body 20 is already in the raised state, the process in step S104 is omitted. After step S104, it is determined in step S105 whether the position of the autonomous mobile robot 10 is the collecting position or not. When the autonomous mobile robot 10 arrives at the collecting position, the process proceeds to step S106. In step S106, the opening-closing portion 23 is opened. Hereby, the trash 31 accommodated in the trash box main body 20 falls down, so that the trash 31 is placed on the autonomous mobile robot 10. That is, the trash 31 is placed on the placement portion 130 of the autonomous mobile robot 10 or the collection box 30 on the placement portion 130. Accordingly, even in a case where the autonomous mobile robot 10 does not include arms having a complicated configuration, the autonomous mobile robot 10 can easily collect the trash. After that, in step S107, the opening-closing portion 23 is closed.

As described above, the trash box main body 20 of the trash box 2 according to the present embodiment is changeable in height from the reference plane 32. Accordingly, a state suitable for the autonomous mobile robot 10 to collect the trash 31 from the lower side of the trash box main body 20 and a state suitable for people to put trash into the trash box 2 can be both achieved. That is, collection of the trash 31 by the autonomous mobile robot 10 from the lower side of the trash box main body 20 can be balanced with convenience for a user who puts the trash 31 into the trash box 2 (that is, the trash box main body 20). Note that, in the embodiment, the trash box main body 20 is changeable between the first state where the trash box main body 20 is distanced from the reference plane 32 at the predetermined distance and the second state where the distance between the trash box main body 20 and the reference plane 32 is shorter than the predetermined distance. However, the trash box main body 20 may be changeable between the first state where the trash box main body 20 is distanced from the reference plane 32 at the predetermined distance and a third state where the distance between the trash box main body 20 and the reference plane 32 is longer than the predetermined distance. Hereby, the height of the trash box main body 20 can be set to a height suitable for the autonomous mobile robot 10 to collect the trash 31 or to a height higher than that and suitable for people to put trash into the trash box main body 20.

Further, in the above embodiment, the height of the trash box main body 20 is changed automatically by the slider driving device 253, but the trash box 2 may not necessarily include a constituent configured to automatically change the height of the trash box main body 20. That is, the height of the trash box main body 20 may be changed manually.

Further, the slider driving device 253 changes the height of the trash box main body 20 based on a detection result on the approach of a person or the autonomous mobile robot 10 as a trigger, but other triggers may be used. For example, the slider driving device 253 may change the height of the trash box main body 20 in response to a recognition result of a gesture or a voice of a person. More specifically, in a case where the sensor 24 or the like detects a predetermined gesture that instructs to change the state of the trash box main body 20 to the raised state, the slider driving device 253 may raise the trash box main body 20. Similarly, in a case where the sensor 24 or the like detects a predetermined gesture that instructs to change the state of the trash box main body 20 to the lowered state, the slider driving device 253 may lower the trash box main body 20. Further, in a case where a sensor configured to perform voice recognition (e.g., a microphone and a voice recognition processor) or the like detects a predetermined voice that instructs to change the state of the trash box main body 20 to the raised state, the slider driving device 253 may raise the trash box main body 20. Similarly, in a case where the sensor configured to perform voice recognition or the like detects a predetermined voice that instructs to change the state of the trash box main body 20 to the lowered state, the slider driving device 253 may lower the trash box main body 20. Further, the slider driving device 253 may change the height of the trash box main body 20 in response to an operation to an operating portion that is a switch (e.g., a button, a lever, or the like) provided in the trash box 2 and operated by physical force (physical contact). Note that the slider driving device 253 may use only either one of the triggers or may use some of the triggers.

Note that the disclosure is not limited to the above embodiments, and various modifications can be made within a range that does not deviate from the gist of the disclosure. For example, in the above embodiment, the position of the autonomous mobile robot 10 is detected by use of the sensor 24 included in the trash box 2, but this detection may be performed based on a notification received by the trash box 2 from other devices. For example, this notification may be a notification transmitted from the autonomous mobile robot 10 to notify the position of the autonomous mobile robot 10, a notification transmitted from a server configured to manage the position of the autonomous mobile robot 10, or a notification transmitted from a sensor or the like provided on the reference plane 32 or the like. Further, the opening-closing portion 23 may be opened when a switch provided in the trash box 2 so as to open the opening-closing portion 23 is operated. This switch may be a button or a lever to be operated by physical force (physical contact). Further, the switch may be provided on the bottom surface of the trash box main body 20 and may be operated by the autonomous mobile robot 10 by use of the placement portion 130.

What is claimed is:

1. A trash box comprising a trash box main body that is configured to accommodate trash, wherein:
   a top surface or a side surface of the trash box main body includes an input port via which the trash is put into the trash box main body;
   a bottom surface of the trash box main body includes an opening-closing portion;
   the trash box main body is placed such that the opening-closing portion faces a reference plane that is a floor face or ground;
   the trash box main body is changeable in height from the reference plane;
   the trash box main body is changeable between a first state and a second state, the first state being a state where the trash box main body is distanced from the reference plane at a predetermined distance, the second state being a state where a distance between the trash box main body and the reference plane is shorter than the predetermined distance;
   the predetermined distance is larger than a height of an autonomous mobile robot configured to collect trash falling from the trash box main body while the opening-closing portion is opened;
   the trash box includes a driving device configured to distance from the reference plane;
   when the trash box detects a person shorter than a predetermined threshold approaching an installation position of the trash box main body, the driving device changes a state of the trash box main body to the second state; and
   when the trash box detects a person equal to or taller than the predetermined threshold approaching the installation position of the trash box main body, the driving device does not change the state of the trash box main body to the second state.

2. The trash box according to claim 1, wherein, when the trash box detects the autonomous mobile robot approaching the installation position of the trash box main body, the driving device changes the state of the trash box main body to the first state.

3. The trash box according to claim 1, wherein the driving device is configured to distance from the reference plane in response to a recognition result of a gesture or a voice of a person.

4. The trash box according to claim 1, wherein the driving device is configured to distance from the reference plane in response to an operation on an operating portion provided in the trash box.

* * * * *